Nov. 6, 1956 — T. H. THOMAS ET AL — 2,769,515
CONTROLLED GRAVITY CONVEYER
Filed Feb. 18, 1953 — 3 Sheets-Sheet 1

INVENTORS
THERON H. THOMAS
BY JOHN W. HUGGINS

ATTORNEYS

Nov. 6, 1956  T. H. THOMAS ET AL  2,769,515
CONTROLLED GRAVITY CONVEYER
Filed Feb. 18, 1953  3 Sheets-Sheet 2
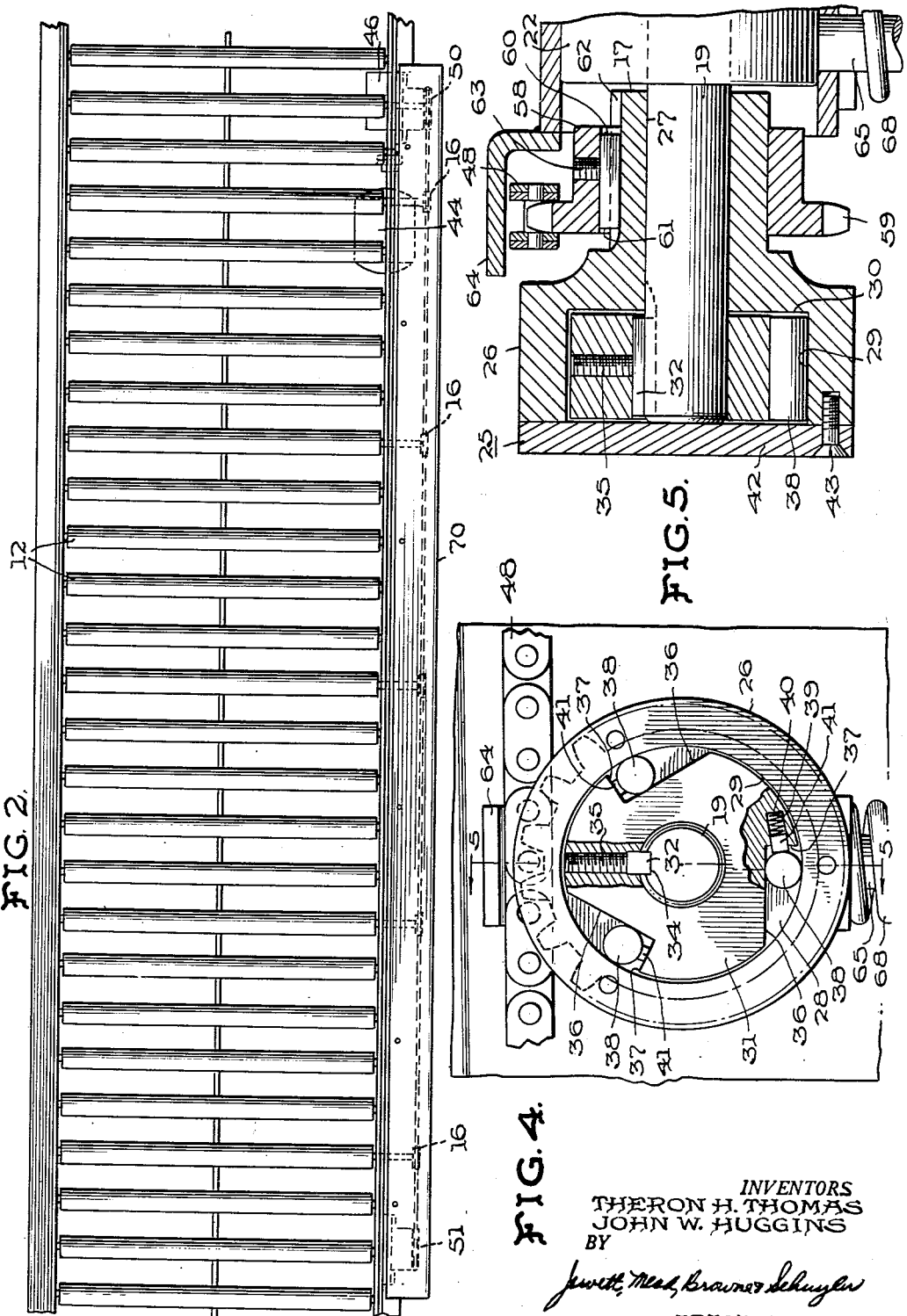
INVENTORS
THERON H. THOMAS
JOHN W. HUGGINS
BY
ATTORNEYS

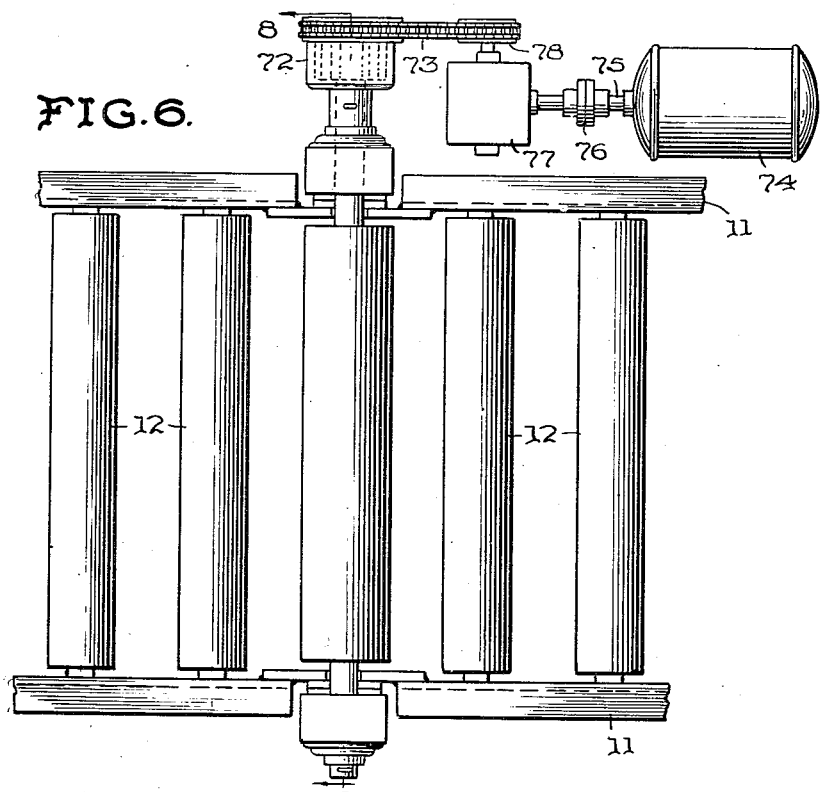
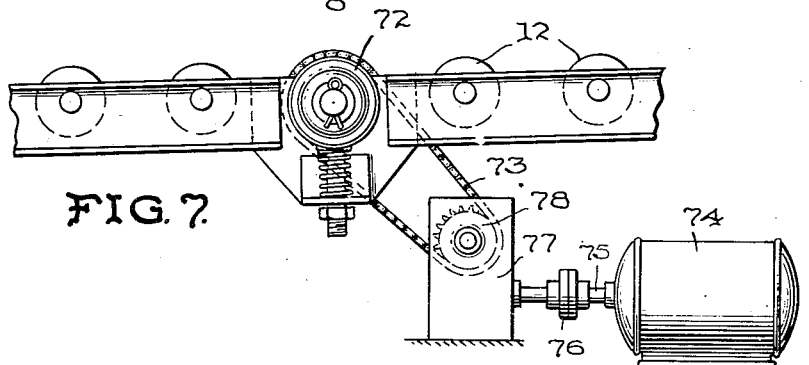
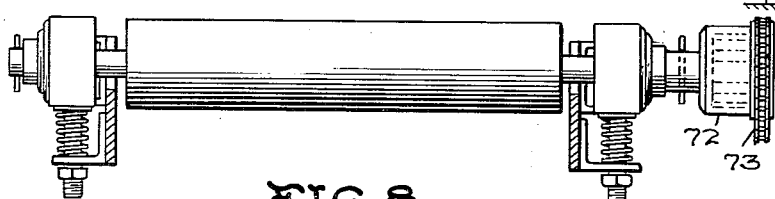

United States Patent Office 2,769,515
Patented Nov. 6, 1956

2,769,515

CONTROLLED GRAVITY CONVEYER

Theron H. Thomas, Arcadia, and John W. Huggins, Palo Alto, Calif., assignors to Mathews Conveyer Company, Ellwood City, Pa., a corporation of Pennsylvania Application February 18, 1953, Serial No. 337,472

12 Claims. (Cl. 193—35)

This invention relates to gravity conveyers and, more particularly, to controlled gravity conveyers in which acceleration of the articles or material being conveyed is arrested to reduce the hazard of damage due to collision of the articles.

In general, in gravity conveying practice, the problem of safe handling becomes acute when it is desired to accumulate and store articles of material on the conveyer. In such case, the articles which have ceased to travel and have assumed a position of rest on the conveyer are in danger of being struck by articles which are still in movement upon the conveyer and have not yet reached their rest position. In particular, when heavy articles are being handled, the rapid acceleration due to gravity of such articles can cause severe collisions between the moving articles and the articles at rest, with a consequent damage to both.

Various types of controlled gravity conveyer systems have been proposed to alleviate the risk involved in accumulating and storing the articles. For the most part, these systems involve the use of some sort of a brake which acts either upon the rollers of the conveyer system or upon the article being conveyed, to retard the movement of the article along the conveyer. Usually, these brakes must be controlled by an operator, so they require constant vigilance to be effective.

Other types of gravity conveyer systems have been proposed which utilize automatic or semi-automatic braking devices to control the movement of articles upon the conveyer according to the load on the conveyer or the number or weight of accumulated articles upon the conveyer. In such conveyers, the brake is controlled by a complicated sensing device of a nature requiring frequent adjustment and constant attention in order to function properly.

It is an object of our invention to provide a controlled gravity conveyer which automatically limits the excessive velocity of articles being conveyed so that such articles will not exceed a maximum safe speed.

It is a further object of this invention to provide a controlled gravity conveyer on which articles or materials can be accumulated without risk of damage due to collisions of the articles with each other or with parts of the conveyer.

Another object of this invention is to provide a controlled gravity conveyer on which articles or materials may be accumulated against a positive stop without developing any more pressure at the accumulating end or region than would be developed by a simple gravity roller conveyer set at optimum grade for positive package movement.

Still another object of this invention is to provide a controlled gravity conveyer with a control device which requires no attention or adjustment after the original installation.

Other objects and advantages of the invention will become apparent from the following specification taken in conjunction with the appended drawings wherein:

Fig. 2 is a plan view of the section shown in Fig. 1;

Fig. 4 is an enlarged sectional view taken along the lines 4, 4 of Fig. 3 showing details of the control device for the control roller;

Fig. 5 is a sectional view taken along the lines 5, 5 of Fig. 4;

Fig. 6 is a fragmentary view of a conveyer section embodying a modified form of the invention;

Fig. 7 is a side elevation of the conveyer section shown in Fig. 6; and

Fig. 8 is a sectional view taken along the lines 8, 8 of Fig. 6.

In its preferred form, the invention includes a roller conveyer section having a pair of inclined side rails supporting a plurality of conventional conveyer rollers between them. At intervals along the conveyer section there are provided rotary elements driven at a predetermined speed and coupled to associated rollers by underrunning clutches. These clutches are so arranged that each rotary element may be driven at its predetermined speed in the direction that articles travel without turning its associated roller.

If the roller is frictionally engaged by an article moving down the conveyer, it is rotated in the same direction as the rotary element is driven. As the roller cannot be turned faster than the speed at which the rotary element is driven, articles engaging the control roller cannot exceed a maximum speed determined by the speed at which the rotary element is driven.

On the other hand, the articles may remain stationary or accelerate to any speed up to the predetermined maximum without damaging the packages or straining parts of the conveyer. If a series of articles accumulate on the conveyer, they are free to move, without increasing the friction of a brake or other control device as soon as the articles ahead begin to move.

Figure 1:
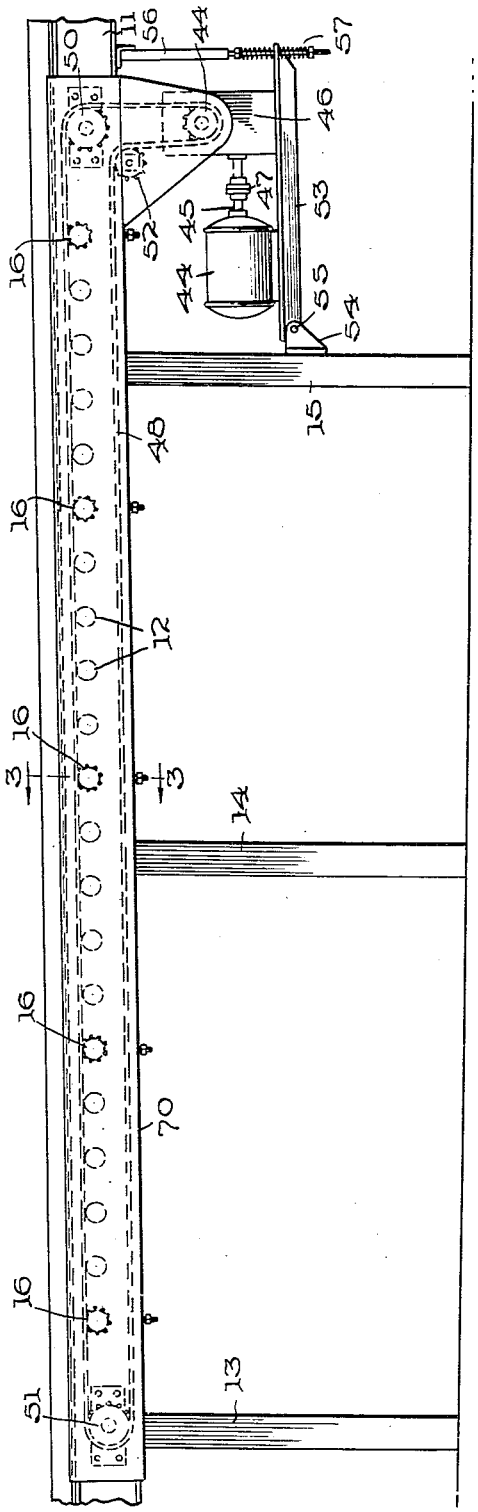
Fig. 1 is a side elevation of a section of a conveyer system embodying the present invention in its preferred form.

Referring to the embodiments of the invention illustrated in the drawings, there is shown in Fig. 1 a section of a roller conveyer system having side rails 11, 11 supporting a plurality of rollers 12 and in turn supported by pairs of legs 13, 14 and 15. In order that the section may function as a gravity conveyer, an inclined conveying surface is provided by making legs 15, 15 somewhat longer than legs 14, 14, which are in turn somewhat longer than legs 13, 13. It is to be understood that any suitable supporting means adapted to give an inclined conveying surface may be used, the pairs of legs 13, 14 and 15 being shown merely as one way of supporting the conveyer section.

Figure 3:
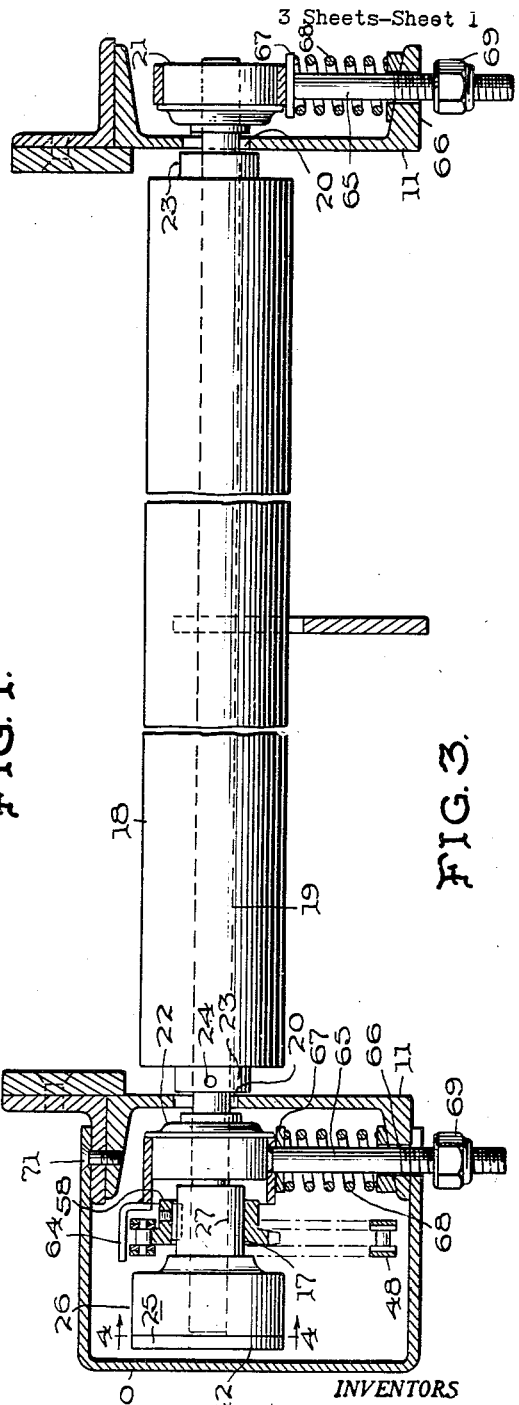
Fig. 3 is a sectional view taken along the lines 3, 3 of Fig. 1 and showing the arrangement for mounting and driving the control roller.

To prevent too rapid movement of articles along the conveyer and to permit storage of articles on the conveyer in a manner which will be explained hereinafter, control units 16 are located at intervals along the conveyer. These control units 16 consist of a rotary element 17 at one side of the conveyer section and an associated roller 18, mounted on a shaft 19. Shaft 19 extends across the width of the conveyer section and through holes 20, 20 in the side rails 11, 11, as best seen in Fig. 3. In order that shaft 19 may rotate freely, it is journaled in bearing assembly 21 at the side of the conveyer opposite the control unit 16 and in bearing assembly 22 at the side adjacent control unit 16. Roller 18 is mounted on shaft 19 for rotation therewith. In the form shown, collar 23 and pin 24 lock the roller to the shaft. To permit coupling with the rotary element 17, shaft 19 extends through bearing assembly 22 for a short distance.

Control unit 16 includes a clutch 25, of the "free wheeling" type permitting free rotation of shaft 19 relative to rotary element 17 in a direction opposite to the direction in which rotary element 17 is driven. As this permits shaft 19 and its control roller to rotate slower than the driven speed of rotary element 17, the clutch 25 may be termed an "underrunning clutch." Although its construction is the same as a conventional "overrunning clutch" the arrangement of clutch 25 with respect to rotary element 17 and shaft 19 limits the speed of the shaft to that of the element but permits a slower speed of the shaft.

While any conventional "free wheeling" clutch may be used, the "underrunning clutch" illustrated in the drawings and hereinafter described has proven particularly satisfactory.

As best shown in Figs. 4 and 5, rotary element 17 has an enlarged diameter portion 26 which forms the outer ring of clutch 25. A hole 27 of a diameter slightly greater than the diameter of shaft 19 is bored through rotary element 17 to permit relative rotation between them when rotary element 17 is mounted in place on the end of shaft 19. The enlarged portion 26 of element 17 has a recess 28 bored therein forming bearing surface 29 and shoulder or abutment 30.

Mounted on the end of shaft 19 is a circular clutch cam member 31 of a diameter slightly smaller than the diameter 29 of recess 28 and of a width slightly less than the depth of recess 28. Member 31 is mounted for rotation with shaft 19 by means of a key 32 riding in a keyway in member 31 and keyway 34 in shaft 19. A set screw 35 serves to hold key 32 in place. As so far described, rotary element 17 is mounted on shaft 19 for rotation with respect thereto while cam member 31 is mounted on shaft 19 for rotation therewith; thus cam member 31 rides in recess 28 and is rotatable with respect to rotary member 17 and clutch ring 26.

In order that clutch ring 26 and therefore rotary member 17 and cam member 31 and hence shaft 19 may be made to rotate together, cam member 31 has a plurality of cam flats 36, 36 and shoulders 37, 37 uniformly spaced around the periphery of member 31. Riding on each cam flat 36 is a hardened steel ball 38 of a diameter such that when ball 38 abuts shoulder 37, the ball 38 will not contact bearing surface 29, but movement of the ball 38 away from shoulder 37 will cause it to frictionally engage bearing surface 29, thus coupling clutch ring 26 and hence rotary element 17 with cam member 31 and hence shaft 19, by a wedging action. In each shoulder 37 there is a hole 39 having inserted therein a spring 40 and a plunger 41. Spring 40 acts to force plunger 41 into contact with ball 38 and urge ball 38 into frictional contact with surface 29, for purposes to be explained hereinafter.

To prevent relative longitudinal movement of rotary element 17 and cam member 31, a cover 42 is mounted on clutch ring 26 and secured by a screw 43. Cover 42 also acts to prevent dust and dirt from accumulating within recess 28.

To drive rotary elements 17 during operation of the conveyer, there is provided, in the embodiment shown in Figs. 1 and 2, a motor 44 mounted at one end of the conveyer section and below the conveying surface thereof. The shaft 45 of the motor 44 is coupled to gear box 46 by means of a coupling 47. The output of gear box 46 drives an endless chain 48 by means of drive sprocket 49. Idler sprockets 50, 51 and 52 are provided to properly guide drive chain 48 with respect to the other elements of the conveyer section, at the same time permitting movement of chain 48. In order that proper tension may be maintained on chain 48, thus insuring positive engagement of the chain with drive sprocket 49 and idler sprockets 50 and 52, motor 44 and gear box 46 are shown mounted on a platform 53, which is swingably mounted on legs 15, 15 by means of bracket 54 and pin 55. The other end of platform 53 is held in position by rod 56 attached to side rail 11 and by spring 57, as shown. Spring 57 acts as a shock absorber while holding platform 53 in horizontal position and the weight of the motor 44 and gear box 46 act against spring 57 to maintain tension in chain 48. It is to be understood that any suitable arrangement may be employed to maintain chain 48 under tension, the arrangement of Fig. 1 being shown merely by way of example.

In order to transmit the drive of chain 48 to rotary elements 17, 17, each rotary element is provided with a sprocket wheel 58 having teeth 59, 59, for engagement with the links of chain 48. Wheel 58 is keyed to rotary element 17 by means of a key 60 riding in keyway 61 of wheel 58 and keyway 62 in rotary element 17. A set screw 63 acts to hold key 60 firmly in place. Positive engagement of chain 48 with teeth 59 of wheel 58 is assured by a guide member 64 mounted on bearing assembly 22 and extending over wheel 58, as best seen in Figs. 4 and 5. Any tendency of chain 48 to slip out of engagement with teeth 59, 59 will be prevented by member 64.

In operation, motor 44 drives shaft 45 in such a direction as to cause the upper course of the chain 48, that is, the portion which engages the sprocket wheels 58, to move in the direction of movement of the article to be conveyed, i. e., downhill. Chain 48, through sprocket wheels 58, will cause rotary members 17 to rotate in a counter-clockwise direction as viewed in Fig. 4. For simplicity's sake, this is referred to hereafter as the "downhill" direction. The speed at which rotary element 17 is driven is determined by the maximum desirable speed of rotation of roller 18, which in turn is determined by how great a retarding force it is desired to apply to the articles being conveyed. This speed may be varied by varying the speed of motor 44 or by varying the speed of travel of chain 48 by means of gear box 46.

Assuming now that there are articles traveling on the conveyer, the rollers 12, being free-running, will permit the article to accelerate under the force of gravity while moving along the conveyer until it contacts a roller 18. Rotary element 17, which is rotated in the downhill direction under the influence of chain 48, through slight frictional engagement of surface 29 with balls 38, 38 acts to urge balls 38 toward shoulders 37, 37, their disengaged position. This slight frictional engagement comes as a result of springs 40, 40, and plungers 41, 41 urging the balls toward their engaged position. With the balls 38, 38 in disengaged position, cam member 31, shaft 19, and roller 18 do not rotate.

When the article on the conveyer contacts one of the rollers 18, it will cause the roller to rotate in the downhill direction through frictional engagement. If the article is traveling at less than the desired speed, it will tend to rotate roller 18, shaft 19, and member 31 at a speed less than the speed of rotation of element 17. Inasmuch as the roller is moving slower than the downhill rotation of rotary element, the relative rotation of roller 18 with respect to element 17 is in the opposite or "uphill" direction. Under these conditions, there is no interaction between member 31 and element 17. Thus, the member 31, balls 38, 38, and surface 29 of clutch ring 26 act as an underrunning clutch, permitting relative rotation of roller 18 with respect to element 17 in an uphill direction as long as the speed of the roller is lower than the speed of the rotary element.

When the article reaches the desire speed, further acceleration will be limited by the control device. If roller 18, shaft 19, and member 31 tend to exceed the speed of element 17, cam flats 36, 36 will force the balls 38, 38 into engagement with surface 29 of clutch ring 26, thereby locking the roller to the rotary element 17. Inasmuch as the speed of rotation of element 17 is constant due to the positive drive of chain 48, gear box 46, and motor 44, the speed of rotation of member 31 cannot exceed the speed of rotation of rotary element 17. Therefore, the speed of an article engaging roller 18 cannot exceed the predetermined safe speed of rotary element 17.

It is obvious that the number of control units 16, the spacing of the control units 16 along the conveyer, or the speed of rotation of rotary element 17 all depend on the size and weight of the articles being conveyed, and the arrangement of Figs. 1 and 2 is shown merely by way of illustration.

When it is desired to accumulate articles on the conveyer, some means, such as a gate, may be placed at the lower end of the conveyer to stop the first article to strike it. Subsequent articles will in turn be stopped by the preceding article; the collisions which take place between articles are slight due to the restricted speed of the articles determined by the control units 16, 16. The articles standing stationary on the conveyer will act to prevent rollers 18, 18 from rotating. When this occurs, the relative rotation of rollers 18, 18 with respect to rotary elements 17, 17 is in the "uphill" direction and the balls 38, 38 will disengage from surfaces 29, 29 clutch rings 26, 26 allowing elements 17, 17 to continue rotating without affecting or being affected by member 31, 31 or rollers 18, 18. Continued rotation of elements 17 is not transmitted to the rollers 18 so the control units do not apply any force to the accumulated articles.

In order that the shock of heavy articles striking rollers 18, 18 will not damage the control units 16, 16, each of the control units 16, 16 is resiliently mounted at each side of the conveyer. These mountings consist of bolts 65, 65 passing through a hole 66, 66 in side rails 11, 11 and having heads 67, 67 suitably attached to bearing assemblies 21 and 22. Coil springs 68, 68 act to urge the bearing members upwardly, against the weight of the articles. These springs 68, 68 act as shock absorbers, permitting momentary downward displacement of roller 18. Stop members 69, 69 prevent springs 68, 68 from causing roller 18 to move too far upwardly when the load is removed by limiting the upward movement of bolts 65, 65 and hence roller 18. Such a shock absorbing device as shown permits setting the control units 16, 16 and rollers 18, 18 slightly higher than adjacent rollers to insure contact with the load, the springs 68, 68 acting to maintain a positive pressure of rollers 18, 18 against the underside of the load. It is to be understood that any shock absorbing device capable of functioning in the foregoing manner may be used, the type here shown being merely by way of illustration.

A safety covering 70, which extends the length of the conveyer section and is held in place by screws 71, 71 protects the control units 16, 16 and protects persons or articles from the chain 48 and sprockets 49, 50, 51 and 58, 58.

For some types of conveying, it may be desirable to have each control unit operating at a different speed of rotation, or to have an individual drive for each control unit. Such an arrangement is shown in Figs. 6, 7 and 8. Each control unit 72 is driven by a drive chain 73 which is, in turn, driven by a motor 74 through shaft 75, coupling 76, gear box 77, and sprocket 78. By providing each control unit with its own drive, it is possible to have a variety of combinations of speeds and spacings of units, depending upon the particular problems of each installation. Thus, the maximum speed may be different at different points along the conveyer.

From the foregoing, it will be readily apparent that the present invention provides a gravity conveyer system in which a positive control is maintained over the speed of articles being conveyed to protect them from damage. This control is ever present and does not interfere with the accumulation or storing of articles on the conveyer.

It is obvious that various modifications and changes may be made to the construction and arrangement of parts forming the present invention without departing from the spirit and scope of the present invention as set forth in the appended claims.

We claim:

1. In a controlled gravity conveyer having means for conveying articles by gravity in one direction, a control device comprising a rotatable element mounted on the conveyer and arranged to engage articles moving along said means, a driven element, and clutch means coupling said elements in a manner permitting relative rotation of said rotatable element with respect to said driven element thereof in a direction opposite to said one direction.

2. In a controlled gravity conveyer having means for conveying articles by gravity in one direction, a driven rotary element, a roller element on the conveyer and arranged to engage articles moving along said means, and a clutch interposed between said elements, said clutch being arranged to limit the speed of rotation of said roller to the speed of rotation of said rotary element while permitting rotation of said roller at a speed lower than the speed of said rotary element.

3. In a conveyer having side rails, conveyer rollers supported by said side rails, support means for supporting said side rails with one end of the conveyer higher than the other end to provide an inclined conveying surface; a control unit comprising a roller for engaging articles moving along the conveying surface, a driven rotary element, and an underrunning clutch interposed between the roller and the rotary element permitting relative rotation of the roller with respect to the rotary element in a direction toward the upper end of said conveyer.

4. In a conveyer having side rails, conveyer rollers supported by said side rails, support means for supporting said side rails with one end of the conveyer higher than the other end to provide an inclined conveying surface; a control unit comprising a roller for engaging articles moving along the conveying surface, a driven rotary element, drive means for driving said rotary element at a predetermined speed toward the lower end of said conveyer, and an underrunning clutch interposed between the roller and the rotary element permitting relative rotation of the roller with respect to the rotary element in a direction toward the upper end of said conveyer.

5. In a conveyer having side rails, conveyer rollers supported by said side rails, support means for supporting said side rails with one end of the conveyer higher than the other end to provide an inclined conveying surface; control units comprising a plurality of rollers for engaging articles moving along the conveying surface, a plurality of driven rotary elements, and an underrunning clutch interposed between each of said rotary elements and one of said rollers permitting relative rotation of the roller with respect to the rotary element in a direction toward the upper end of the conveyer.

6. In a conveyer having side rails, conveyer rollers supported by said side rails, support means for supporting said side rails with one end of the conveyer higher than the other end to provide an inclined conveying surface; control units comprising a plurality of rollers for engaging articles moving along the conveying surface, a plurality of rotary elements, means for driving said rotary elements at a uniform predetermined speed toward the lower end of said conveyer, and an underrunning clutch interposed between each of said rotary elements and one of said rollers permitting relative rotation of the roller with respect to the rotary element in a direction toward the upper end of the conveyer.

7. In a controlled gravity conveyer for conveying articles in one direction, a driven rotary element, a resiliently mounted roller element having its upper surface higher than the plane of the conveyer to insure contact with articles moving along the conveyer, and a clutch interposed between said elements, said clutch being arranged to limit the speed of rotation of said roller to the speed of rotation of said rotary element while permitting rotation of said roller at a speed lower than the speed of said rotary element.

8. In a conveyer having side rails, conveyer rollers supported by said side rails, support means for supporting said side rails with one end of the conveyer higher than the other end to provide an inclined conveying surface; a control unit comprising a roller for engaging articles moving along the conveying surface, resilient mountings for said roller, the upper surface of said roller being higher than the conveying surface to insure contact with articles moving along the conveyer, a driven rotary element, and an underrunning clutch interposed between the roller and the rotary element permitting relative rotation of the roller with respect to the rotary element in a direction for the upper end of said conveyer.

9. In a conveyer having side rails, conveyer rollers supported by said side rails, support means for supporting said side rails with one end of the conveyer higher than the other end to provide an inclined conveying surface; a control unit comprising a roller for engaging articles moving along the conveying surface, resilient mountings for said roller, the upper surface of said roller being higher than the conveying surface to insure contact with articles moving along the conveyer, a driven rotary element, drive means for driving said rotary element at a predetermined speed toward the lower end of said conveyer, and an underrunning clutch interposed between the roller and the rotary element permitting relative rotation of the roller with respect to the rotary element in a direction toward the upper end of said conveyer.

10. In a conveyer having side rails, conveyer rollers supported by said side rails, support means for supporting said side rails with one end of the conveyer higher than the other end to provide an inclined conveying surface; control units comprising a plurality of rollers for engaging articles moving along the conveying surface, resilient mountings for each of said rollers, the upper surfaces of said rollers being higher than the conveying surface to insure contact with articles moving along the conveyer, a plurality of driven rotary elements, and an underrunning clutch interposed between each of said rotary elements and one of said rollers permitting relative rotation of the roller with respect to the rotary element in a direction toward the upper end of the conveyer.

11. In a conveyer having side rails, conveyer rollers supported by said side rails, support means for supporting said side rails with one end of the conveyer higher than the other end to provide an inclined conveying surface; control units comprising a plurality of rollers for engaging articles moving along the conveying surface, resilient mountings for each of said rollers, the upper surfaces of said rollers being higher than the conveying surface to insure contact with articles moving along the conveyer, a plurality of rotary elements, means for driving said rotary elements at a uniform predetermined speed in a direction toward the lower end of said conveyer, and an underrunning clutch interposed between each of said rotary elements and one of said rollers permitting relative rotation of the roller with respect to the rotary element in a direction toward the upper end of the conveyer.

12. In a controlled gravity conveyer for conveying articles in one direction, a control device comprising a roller element for engaging articles moving along the conveyer in said one direction, a driven rotary element, means for driving said rotary element at a uniform speed in said one direction, and an underrunning clutch having one element connected to said roller element and the other element connected to said rotary element in a manner permitting rotation of said roller element in said one direction at a speed less than said rotary element and preventing rotation of said roller element in said one direction at a speed greater than said rotary element.

References Cited in the file of this patent

UNITED STATES PATENTS

| | | |
|---|---|---|
| 897,846 | Olds | Sept. 1, 1908 |
| 1,362,910 | Zoeller et al. | Dec. 21, 1920 |
| 1,778,526 | Haiss | Oct. 14, 1930 |
| 1,900,150 | Anderson | Mar. 7, 1933 |
| 2,134,373 | Parker | Oct. 25, 1938 |
| 2,609,917 | Gotthardt | Sept. 9, 1952 |
| 2,618,370 | Orwin | Nov. 18, 1952 |